United States Patent
Bosson et al.

(10) Patent No.: US 10,173,786 B2
(45) Date of Patent: Jan. 8, 2019

(54) PILOT ASSISTANCE SYSTEM OF AN AIRCRAFT

(71) Applicant: THALES, Courbevoie (FR)

(72) Inventors: Joel Bosson, Meudon la Foret (FR); Christophe Garnavault, Meudon la Foret (FR); Eric Guillouet, Toulouse (FR)

(73) Assignee: THALES, Courbevoie (FR)

( * ) Notice: Subject to any disclaimer, the term of this patent is extended or adjusted under 35 U.S.C. 154(b) by 121 days.

(21) Appl. No.: 14/878,489

(22) Filed: Oct. 8, 2015

(65) Prior Publication Data

US 2016/0101873 A1    Apr. 14, 2016

(30) Foreign Application Priority Data

Oct. 8, 2014 (FR) ...................... 14 02267

(51) Int. Cl.
| | |
|---|---|
| *B64D 45/00* | (2006.01) |
| *G01C 21/00* | (2006.01) |
| *B64C 13/04* | (2006.01) |
| *B64C 13/12* | (2006.01) |
| *G01C 23/00* | (2006.01) |

(52) U.S. Cl.
CPC .............. *B64D 45/00* (2013.01); *B64C 13/04* (2013.01); *B64C 13/12* (2013.01); *B64D 45/0005* (2013.01); *G01C 21/00* (2013.01); *G01C 23/00* (2013.01)

(58) Field of Classification Search
CPC .... B64D 45/00; B64D 45/0005; B64D 13/04; B64D 13/12; B64D 13/00; G01C 21/00; G01C 23/00; G01C 23/005; G05D 1/00; G05D 1/0808; G05D 1/02; G05D 1/0202; G05D 1/08; G05D 1/04; G05D 1/042; B64C 13/04; B64C 13/12; B64C 13/00
See application file for complete search history.

(56) References Cited

U.S. PATENT DOCUMENTS

| | | | |
|---|---|---|---|
| 4,663,627 A | 5/1987 | Dennis | |
| 4,688,443 A | 8/1987 | Fabre et al. | |
| 6,072,473 A | * 6/2000 | Muller | G01C 23/00 |
| | | | 345/156 |

(Continued)

FOREIGN PATENT DOCUMENTS

| | | |
|---|---|---|
| EP | 204598 | 12/1986 |
| EP | 1016851 | 7/2000 |

OTHER PUBLICATIONS

Search Report for FR1402267.

*Primary Examiner* — Abby Y Lin
(74) *Attorney, Agent, or Firm* — Davidson, Davidson & Kappel, LLC

(57) ABSTRACT

The present invention relates to an aid system (30) for piloting an aircraft, the aircraft including at least two piloting units each having at least one piloting member that can be actuated by a pilot to command at least one control surface of the aircraft.

The piloting aid system (30) includes a module (32) for detecting actions performed on at least one piloting unit and a feedback module (34) indicating, via a man-machine interface (24A, 24B) separate from the piloting members, the movement of said piloting member and/or the force exerted on said piloting member.

18 Claims, 2 Drawing Sheets

(56) References Cited

U.S. PATENT DOCUMENTS

| | | | |
|---|---|---|---|
| 2008/0001847 A1* | 1/2008 | Kratchounova | G01C 23/00 345/1.1 |
| 2013/0176953 A1* | 7/2013 | Stern-Berkowitz | H04W 52/146 370/329 |
| 2013/0233975 A1* | 9/2013 | Joalland | B64C 13/16 244/194 |
| 2014/0074325 A1 | 3/2014 | Nikolic et al. | |
| 2014/0232568 A1* | 8/2014 | Pennell | B64D 45/00 340/967 |

* cited by examiner

US 10,173,786 B2

PILOT ASSISTANCE SYSTEM OF AN AIRCRAFT

FIELD OF THE INVENTION

The present invention relates to an aid system for the piloting of an aircraft, an aircraft including at least two piloting units and such a piloting aid system.

Some aircraft have two piloting units usable by pilots redundantly. Thus, each pilot can take control of the aircraft at any time, from his own piloting unit, without needing to intervene on the piloting unit of the other pilot.

In this context, problems of coordinating the actions of the pilots on piloting units of the same type may have significant consequences for the overall safety of the flight. These problems become even greater when the pilots' tasks are varied and complicated, for example certain tasks performed during takeoff and landing phases of the aircraft.

BACKGROUND OF THE INVENTION

The problems of coordinating actions by the pilots more particularly relate to piloting units frequently used by pilots, for example a control stick or rudder bar of the aircraft. Indeed, the actions performed by one of the pilots on these piloting units are not always easy for the other pilot to understand, which results in a lack of coordination in the actions between the pilots.

The mechanical coupling between the control sticks and the corresponding rudder bars of the different handling units makes it possible to simplify the coordination of actions by the pilots, but is not fully satisfactory.

Furthermore, with the introduction of electric flight controls, the complexity and cost of avionics systems using such mechanical coupling are considerably increased, to the point that some aviators have given up mechanical coupling for at least some corresponding piloting members.

SUMMARY OF THE INVENTION

The present invention aims to propose an aid system for the piloting of an aircraft allowing pilots to better coordinate their actions.

To that end, the invention relates to an aid system for piloting an aircraft, the aircraft including at least two piloting units each having at least one piloting member that can be actuated by a pilot to command at least one control surface of the aircraft;

the piloting aid system including a module for detecting actions performed on at least one piloting unit and a feedback module indicating, via a man-machine interface separate from the piloting members, the movement of said piloting member and/or the force exerted on said piloting member.

According to other advantageous aspects of the invention, the piloting aid system comprises one or more of the following features, considered alone or according to all technically possible combinations:

the feedback module indicates, via a man-machine interface of one of the piloting units, the movement of at least one piloting member of the other piloting unit and/or the force exerted on at least that piloting member;

the man-machine interface is a display screen;

the display screen is a primary flight display of the corresponding control unit;

the display screen is able to display a graphic illustration of the movement of at least one piloting member and/or the force exerted on at least that piloting member;

the graphic representation is displayed on the corresponding display screen after the end of actuation on the piloting member corresponding to that graphic representation, during a predetermined length of time;

the graphic representation comprises at least one arrow indicating the actuating direction of the piloting member corresponding to that graphic representation;

the length of the arrow corresponds to the actuating magnitude of the corresponding piloting member;

at least one piloting member is a control stick able to control at least one control surface of the aircraft to create a rotating movement around the pitch axis or the roll axis of the aircraft;

the direction of the arrow corresponding to the actuating of the sleeve to create a rotating movement around the roll axis corresponds to the west or east direction relative to a static element;

the direction of the arrow corresponding to the actuation of the control stick to create a rotary movement around the pitch axis corresponds to the north or south direction relative to the static element;

at least one piloting member is a rudder bar able to command at least one control surface of the aircraft to create a rotational moment around the yaw axis of the aircraft;

the direction of the arrow corresponding to the actuating of the rudder bar to create a rotating movement around the yaw axis corresponds to the northwest or northeast direction relative to a static element;

the piloting members associated with different piloting units are at least partially coupled to one another;

the piloting members associated with different piloting units are at least partially independent from one another.

The present invention also relates to an aircraft including at least two piloting units each having at least one piloting member able to be actuated by a pilot to command at least one control surface of the aircraft, and a piloting aid system as previously described.

BRIEF DESCRIPTION OF THE DRAWINGS

The features and advantages of the invention will appear upon reading the following description, provided solely as a non-limiting example, and done in reference to the appended drawings, in which.

DETAILED DESCRIPTION OF THE INVENTION

Within the meaning of the present invention, a piloting member is any member that can be actuated by the pilot to pilot the aircraft, in particular to command the control surfaces and create a moment around one of the three axes of the aircraft from among the roll axis, the pitch axis and the yaw axis. Such a piloting member generally comprises a control stick and a rudder bar.

Figure 1:
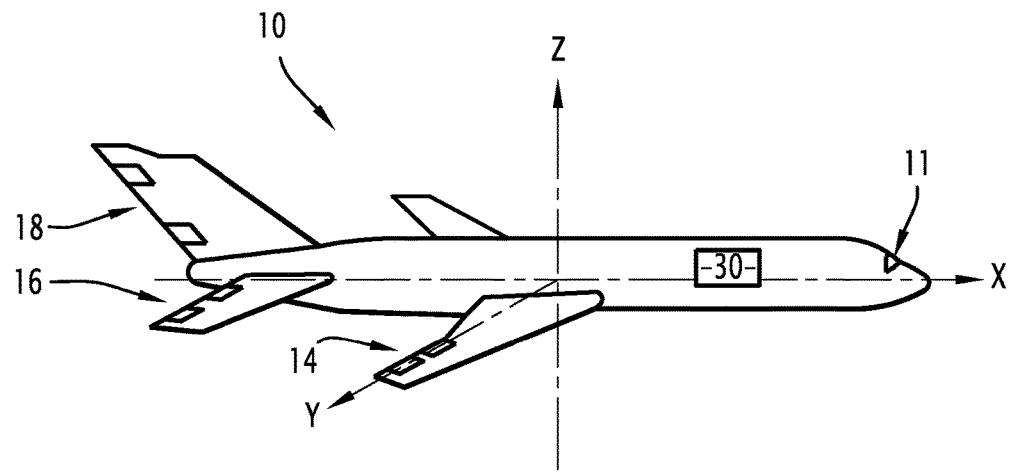
FIG. 1 is a diagrammatic view of an aircraft according to the invention, the aircraft including a cockpit and a piloting aid system according to the invention.
Figure 2:
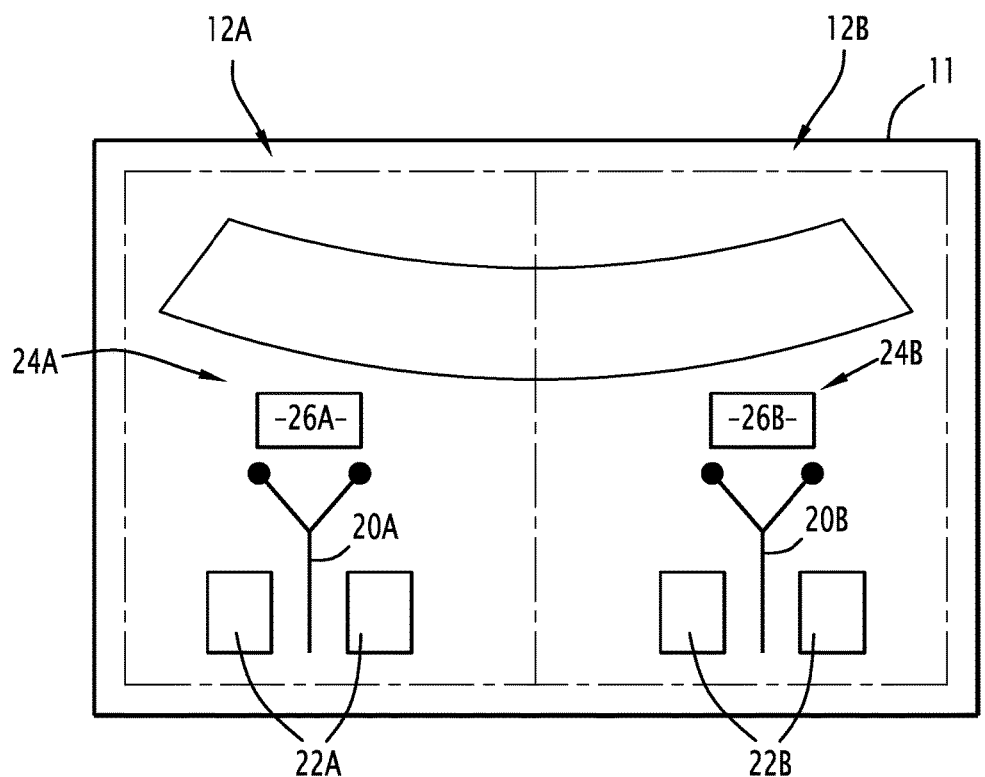
FIG. 2 is a diagrammatic view of the cockpit of the aircraft of FIG. 1, the cockpit including at least one display screen.

The aircraft 10 of FIG. 1 is an airplane including a cockpit 11 comprising two piloting units 12A, 12B shown in FIG. 2, and a plurality of control sticks 14, 16, 18 that can be actuated by a pilot for each of the piloting units 12A, 12B.

According to FIG. 2, each piloting unit 12A, 12B includes a control stick 20A, 20B, a rudder bar 22A, 22B and a man-machine interface 24A, 24B separate from each of the piloting members.

The control stick 20A, 20B is for example able to command the roll control surfaces 14, for example comprising airfoils, to create a moment around the roll axis X of the aircraft 10, and the depth control surfaces 16 to create a moment around the pitch axis Y of the aircraft 10.

The rudder bar 22A, 22B is for example able to control the steering control surface 18 of the aircraft 10 to create a moment around the yaw axis Z of the aircraft 10. Each rudder bar 22A, 22B is formed by a right pedal and a left pedal.

According to one alternative embodiment, the control sticks 20A, 20B are mechanically coupled to one another and mechanically connected to the control sticks 14 and 16. Similarly, the rudder bars 22A, 22B are mechanically coupled to one another and mechanically connected to the rudder bar 18.

According to another alternative embodiment, the control sticks 20A, 20B are not mechanically coupled to one another and connected by electric flight commands to the control surfaces 14 and 16. According to the same alternative embodiment, the rudder bars 22A, 22B are mechanically coupled to one another and connected to the control stick 18 by electric flight controls.

The man-machine interface 24A, 24B is connected to a computer onboard the aircraft 10 and is able to communicate information related to the piloting of the aircraft 10 to the pilot of the corresponding piloting unit 12A, 12B.

Figure 3:
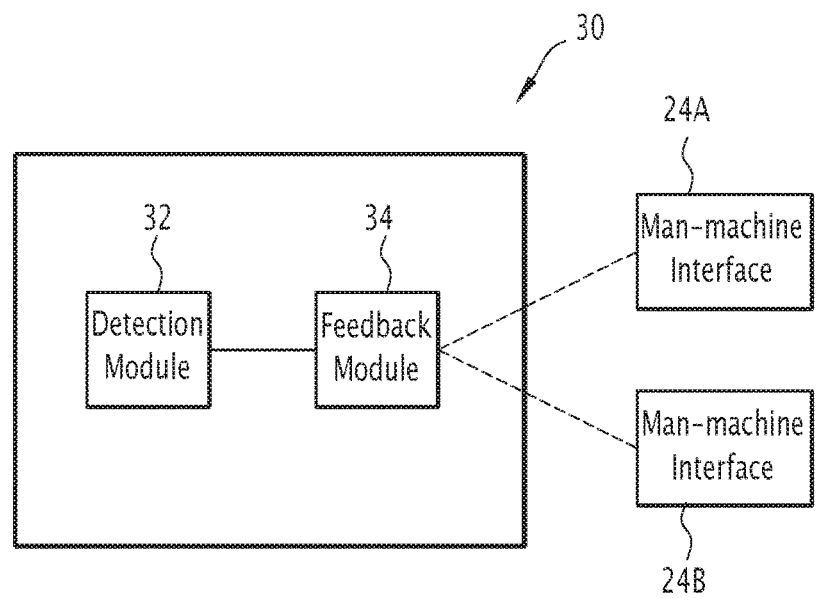
FIG. 3 is a diagrammatic view of the piloting a system of FIG. 1.

Each man-machine interface 24A, 24B for example comprises a display screen 26A, 26B, such as a primary flight display (PFD) known in itself The aircraft 10 according to the invention further includes a piloting aid system 30 according to the invention illustrated in more detail in FIG. 3.

Thus, as illustrated in this FIG. 3, the system 30 includes a detection module 32 connected to at least some of the piloting members of each of the piloting units 12A, 12B, and a feedback module 34 connected to the detection module 32 on the one hand and to the man-machine interfaces 24A, 24B of those piloting units 12A, 12B on the other hand.

The detection module 32 is able to detect actions by the pilot exerted on the corresponding piloting members.

More particularly, the detection module 32 is able to detect the movement of the control stick 20A, 20B and of the rudder bar 22A, 22B and/or the force exerted by the pilot on the corresponding piloting unit 12A, 12B on that control stick and that rudder bar.

The detection module 32 is for example made in the form of a software component able to produce a plurality of digital data associated with each of the piloting units 12A, 12B and describing the movement of the corresponding piloting members as well as the forces exerted on those members.

Thus, for example, these data comprise:

the direction and magnitude of the movement of the corresponding control stick 20A, 20B, and/or the force exerted on that control stick 20A, 20B;

the movement magnitude of the right pedal and the left pedal of the corresponding rudder bar 22A, 22B, and/or the force exerted on each of these pedals;

The feedback module 34 is for example made in the form of software able to receive the digital data produced by the detection module 32.

The feedback module 34 is further able to process the digital data associated with one of the piloting units 12A, 12B to indicate the movement of the control stick 20A, 20B and/or the rudder bar 22A, 22B of the piloting unit and/or the forces exerted on those members, via the man-machine interface 24A, 24B of the other piloting unit 12A, 12B.

To that end, the feedback module 34 is able to build a graphic representation 40 of these movements and these forces.

The display screen 26A, 26B of the corresponding man-machine interface 24A, 24B is then able to display that graphic representation 40.

Figure 4:
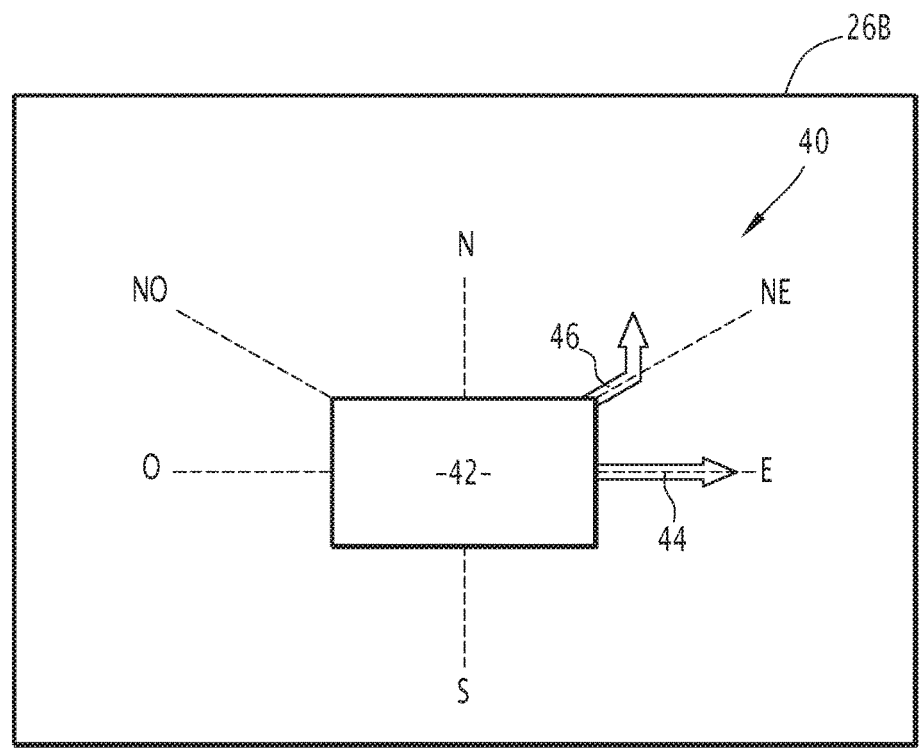
FIG. 4 is a diagrammatic view of the display screen of FIG. 2.

FIG. 4 illustrates an example of such a graphic representation 40 displayed on the display screen 26B and indicating the movement of the control stick 20A and the rudder bar 22A as well as the forces exerted on those members.

The graphic representation 40 is displayed on the screen 26B throughout the entire actuating duration of the control stick 20A and/or of the rudder bar 22A and furthermore, optionally, during a predetermined additional length of time after the end of this actuation.

This predetermined length of time is for example equal to 3 s.

The graphic representation 40 comprises a static element 42 displayed statically throughout the entire display time and an arrow 44, 46 for each affected piloting member.

The direction of each arrow 44, 46 indicates the actuating direction of the corresponding piloting member and its length corresponds to the actuating magnitude of that member.

The arrow 44 is associated with the control stick 20A and able to assume the west O or east E direction relative to the static element 42 if the control stick 20A is actuated to create a rotary movement around the roll axis X, or the north N or south S direction relative to the static element 42 if the control stick 20A is actuated to create a rotary movement around the pitch axis Y.

The arrow 46 is associated with the rudder bar 22A and is able to assume the northwest NO direction if the left pedal of the rudder bar 22A is actuated and the northeast direction if the right pedal of the rudder bar 22A is actuated.

In the example shown in FIG. 4, the arrow 44 is displayed in the east direction E, which means that the control stick 20A is actuated to create a rotary moment of the aircraft 10 around the roll axis X in the clockwise direction.

In the same figure, the arrow 46 is displayed in the northeast direction NE, which means that the right pedal of the rudder bar 22A is actuated.

The operation of the piloting aid system 30 will now be explained.

During the piloting of the aircraft 10, the detection module 32 monitors the actuation of the piloting members of the two piloting units 12A, 12B.

When the pilot of one of the piloting units 12A, 12B actuates the control stick 20A, 20B and/or the rudder bar 22A, 22B, the detection module 32 generates digital data corresponding to the actuation and sends them to the feedback module 34.

The feedback module 34 processes those data and builds the graphic representation 40 of this actuation. This graphic representation 40 is next displayed on the display screen 26A, 26B of the other pilot, i.e., on the screen of the pilot not performing an action.

After the end of actuation, the graphic representation 40 is displayed on that screen again during the predetermined length of time.

One skilled in the art will understand that many other embodiments of the present invention are possible.

It is for example possible to apply the present invention to piloting members other than the control stick and the rudder bar.

It is also possible to use, in general, indicator means other than PFD display screens, such as head-up display screens or audio, visual or tactile indications.

Lastly, it is possible to apply the invention to other types of aircraft, for example rotorcraft.

One can then see that the present invention includes a certain number of advantages.

In particular, it makes it possible to facilitate the coordination of the actions by the pilots. Each pilot is informed by the system immediately after one of the piloting members is actuated by the other pilot. This information remains available to the pilot for several seconds after the end of actuation.

Furthermore, the piloting aid system can be made in the form of software using components already present in most modern cockpits.

Lastly, the piloting aid system is independent of avionics systems implementing mechanical coupling between piloting members of the same type.

The invention claimed is:

1. A piloting aid system for piloting an aircraft, the aircraft including at least two piloting units each having at least one piloting member actionnable by a pilot to command at least one control surface of the aircraft and a man-machine interface separate from the at least one piloting member, different piloting units being used by different pilots;
the piloting aid system including a module for detecting actions performed on at least one piloting member and a feedback module, the feedback module including non-transitory computer readable media configured to control a computer to indicate, via the man-machine interface of one of the piloting units, the movement of said at least one piloting member or the force exerted on said at least one piloting member, and to indicate, via the man-machine interface of one of the piloting units, a direction and magnitude of the movement of at least one piloting member of the other of the at least two piloting units or the force exerted on at least that piloting member.

2. The system according to claim 1, wherein the man-machine interface is a display screen.

3. The system according to claim 2, wherein the display screen is a primary flight display of said one of the piloting units.

4. The system according to claim 2, wherein the display screen is configured to display a graphic representation of the movement of at least one piloting member or the force exerted on at least that piloting member.

5. The system according to claim 4, wherein the graphic representation is displayed on the corresponding display screen after the end of actuation on the piloting member corresponding to that graphic representation, during a predetermined length of time.

6. The system according to claim 4, wherein the graphic representation comprises at least one arrow indicating the actuating direction of the piloting member corresponding to that graphic representation.

7. The system according to claim 6, wherein the length of the arrow corresponds to the actuating magnitude of the corresponding piloting member.

8. The system according to claim 1, wherein the piloting members associated with different piloting units are at least partially coupled to one another.

9. The system according to claim 1, wherein the piloting members associated with different piloting units are at least partially independent from one another.

10. An aircraft including at least two piloting units each having at least one piloting member that can be actuated by a pilot to command at least one control surface of the aircraft and a man-machine interface separate from the at least one piloting member, different piloting units being used by different pilots; and
a piloting aid system including a module for detecting actions performed on at least one piloting member and a feedback module configured to indicate, via the man-machine interface of one of the piloting units, the movement of said at least one piloting member or the force exerted on said at least one piloting member;
wherein the feedback module is configured to indicate, via the man-machine interface of one of the piloting units, a direction and magnitude of the movement of at least one piloting member of the other of the at least two piloting units or the force exerted on at least that piloting member.

11. An aid system for piloting an aircraft, the aircraft including at least two piloting units each having at least one piloting member actionnable by a pilot to command at least one control surface of the aircraft, the aid system including
a man-machine interface separate from the at least one piloting member, different piloting units being used by different pilots;
a piloting aid system including a module for detecting actions performed on at least one piloting member and a feedback module configured to indicate, via the man-machine interface of one of the piloting units, the movement of said at least one piloting member;
wherein the feedback module is configured to indicate, via the man-machine interface of one of the piloting units, a direction and magnitude of the movement of at least one piloting member of the other of the at least two piloting units.

12. The system according to claim 11, wherein the man-machine interface of each piloting unit is a display screen.

13. The system according to claim 12, wherein the display screen is configured to display a graphic representation of the movement of at least one piloting member.

14. The system according to claim 11, wherein at least one piloting member is a control stick configured to control at least one control surface of the aircraft to create a rotating movement around the pitch axis or the roll axis of the aircraft.

15. The system according to claim 14,
wherein the man-machine interface of each piloting unit is a display screen;
wherein the display screen is configured to display a graphic representation of the movement of at least one piloting member or the force exerted on at least that piloting member;

wherein the graphic representation comprises at least one arrow indicating the actuating direction of the piloting member corresponding to that graphic representation;

wherein:

the direction of the arrow corresponding to the actuating of the control stick to create a rotating movement around the roll axis corresponds to the west or east direction relative to a static element; and the direction of the arrow corresponding to the actuation of the control stick to create a rotary movement around the pitch axis corresponds to the north or south direction relative to the static element.

16. The system according to claim 11, wherein at least one piloting member is a rudder bar configured to control at least one control surface of the aircraft to create a rotating movement around the yaw axis of the aircraft.

17. The system according to claim 16, wherein the man-machine interface of each piloting unit is a display screen;

wherein the display screen is configured to display a graphic representation of the movement of at least one piloting member or the force exerted on at least that piloting member;

wherein the graphic representation comprises at least one arrow indicating the actuating direction of the piloting member corresponding to that graphic representation;

wherein the direction of the arrow corresponding to the actuating of the rudder bar to create a rotating movement around the yaw axis corresponds to the northwest or northeast direction relative to a static element.

18. An aid system for piloting an aircraft, the aircraft including at least two piloting units each having at least one piloting member actionnable by a pilot to command at least one control surface of the aircraft, the aid system including a man-machine interface separate from the at least one piloting member, different piloting units being used by different pilots;

a piloting aid system including a module for detecting actions performed on at least one piloting member and a feedback module configured to indicate, via the man-machine interface of one of the piloting units, the force exerted on said at least one piloting member;

wherein the feedback module configured to indicate, via the man-machine interface of one of the piloting units, a direction and magnitude of the force exerted on said at least one piloting member of the other of the at least two piloting units.

\* \* \* \* \*